United States Patent [19]

Sobolev et al.

[11] Patent Number: 4,742,402
[45] Date of Patent: May 3, 1988

[54] SEISMOELECTRIC SIGNAL RECORDING DEVICE

[75] Inventors: Gennady A. Sobolev; Vladislav M. Demin; Vladimir F. Los; Zinovy-Jury Y. Maibuk, all of Moscow, U.S.S.R.

[73] Assignee: Institute Fiz Iki Zemli Im O Ju Shmidta An SSSR, Moscow, U.S.S.R.

[21] Appl. No.: 847,658

[22] PCT Filed: Jul. 19, 1984

[86] PCT No.: PCT/SU84/00038
§ 371 Date: Mar. 7, 1986
§ 102(e) Date: Mar. 7, 1986

[87] PCT Pub. No.: WO86/01002
PCT Pub. Date: Feb. 13, 1986

[51] Int. Cl.$^4$ ............................................. G11B 5/00
[52] U.S. Cl. ........................................................ 360/6
[58] Field of Search ........................ 360/6, 22; 367/21

[56] References Cited

U.S. PATENT DOCUMENTS

| 2,629,784 | 2/1953 | Daniels | 360/22 |
| 3,412,218 | 11/1968 | Comerci | 360/22 |
| 3,805,293 | 4/1974 | Weinberger et al. | 360/6 |

Primary Examiner—Vincent P. Canney
Attorney, Agent, or Firm—Lilling & Greenspan

[57] ABSTRACT

A device for recording seismoelectric signals comprises at least three channels for reception of seismoelectric signals in different frequency bands, each channel having a magnetic antenna (1,2,3) with series-connected amplifier (4,5,6) and a uniform frequency characteristic former (7,8,9), and also two video recorders (10,11), the first video recorder being connected to an output of the receiving channel having the lowest frequency, while the second video recorder (11) is connected, via an adder (12), to the outputs of all other channels.

4 Claims, 3 Drawing Sheets

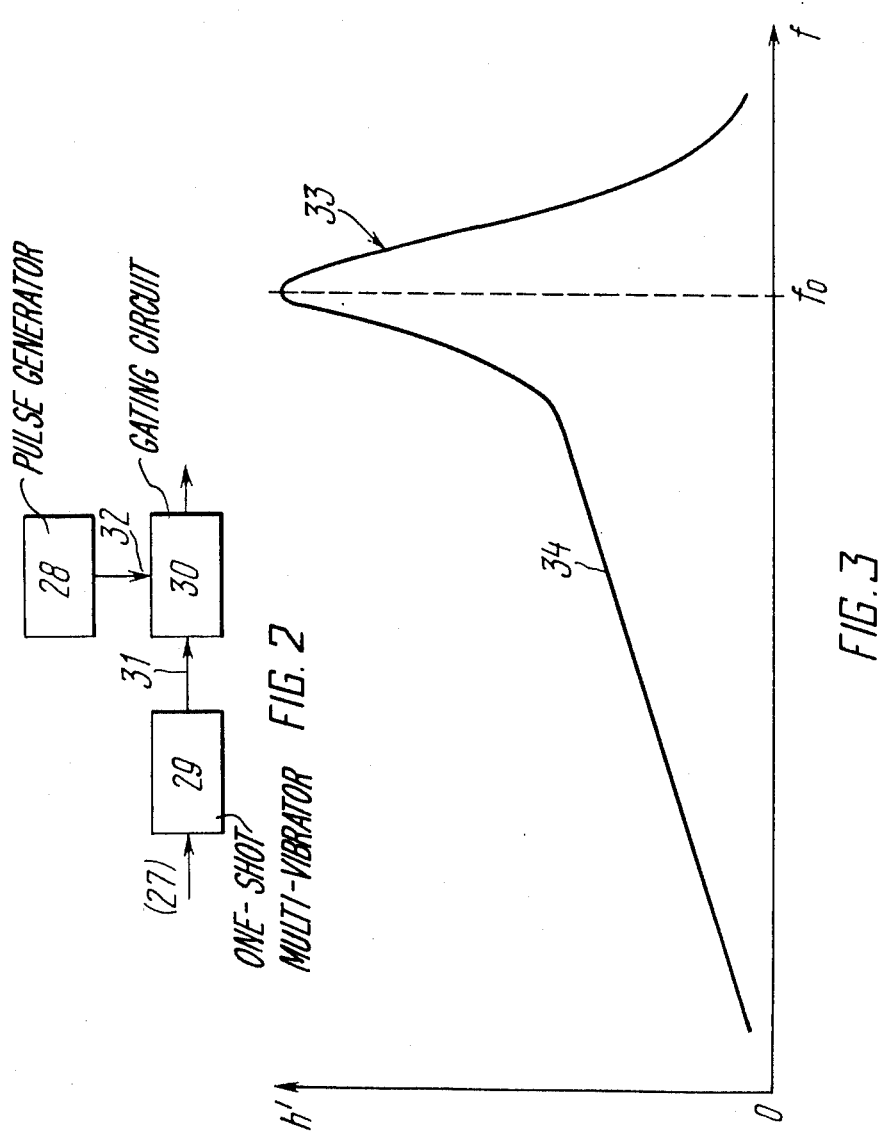

SEISMOELECTRIC SIGNAL RECORDING DEVICE

BACKGROUND OF THE INVENTION

1. Field of the Invention

This invention relates to devices for recording non-electric signals and is more particularly concerned with seismoelectric signal recording devices.

2. Description of the Prior Art

Known in the art is a seismoelectric signal recording device which is used for mineral prospecting. This device comprises several electromagnetic receivers, each having a pair of metal spikes which serve as electrodes. Each receiver is equipped with an amplifier from which signals are fed to a recorder which is, for example, a mirror-galvanometer oscillograph (cf., for example, USSR Invention's Certificate No. 174,380, IPC[3] G 01 V 11/00, published in "Otkrytia, izobretenia, promyshlennye obraztsy, tovarnye znaki" No. 17,1965, Device for Mineral Prospecting).

The receiving electrodes are pickups of electrical voltages induced by the electromagnetic radiation in the rock rather than pickups of the electromagnetic radiation itself.

Voltages to be recorded are seriously affected where current conducting objects, such as rails or pipes in air headings, occur in the vicinity of the receiving electrodes. Moreover, modern mines are packed with powerful electrical equipment and surrounding rock is full of substantial currents of the mains frequency and its harmonics, which fall into the frequency range of the device and affect its sensitivity.

In addition, an array of receiving electrodes having long, tens of meters, connecting wires is inherently a low-frequency system. In other words the frequency band received by the electrodes is limited to the first tens of kilocycles.

The recorder of the device uses photographic paper since it is a mirror-galvanometer oscillograph. This also limits the frequency band of recorded signals because this frequency band is restricted by the mechanical resonance frequency of the galvanometer which rarely reaches 10 kilocycles even in the best instruments of this type.

The mirror-galvanometer oscillograph used as a recorder is also a serious disadvantage of the device since it involves handling of light-sensitive materials, their chemical treatment and drying processes. Besides, the lengthy treatment of photographic materials affects the efficiency of the device.

Also known in the art is a device for recording seismoelectric signals, comprising several seismoelectric pickups which are electrodes, each pickup being equipped with an amplifier and a magnetic tape recorder connected to each amplifier. The device has a time mark generator connected to the magnetic recorder to record time marks thereon, a shot instant pickup and a control unit of the device (cf., for example, Razvedka i okhrana nedr, No. 4, 1973, Moscow, V. G. Smirnov et al. "Kvarts-G seismoelectric station, pp. 35-40).

The aforementioned device operates as follows.

Signals from the receiving pickups are amplified and supplied to respective inputs of the multitrack tape recorder. Other inputs of the tape recorder receive signals of the time mark generator and the shot instant pickup.

The tape transport is switched on prior to the explosion to start turning the magnetic tape loop whereon the information is recorded by means of a multitrack head. Recording is started at the moment the signal from the shot instant pickup arrives and ends when the tape loop completes a full turn.

The known device is deficient in that it does not register signals whose frequency exceeds 20 kilocycles, the limitation being imposed by the capacity of the tape recorder. It should be remembered that higher frequencies carry the bulk of the useful information on ore bodies within the rock, their structure and mineral composition.

The difference between the amplitudes of signals within the frequency band up to 20 kHz and over 20 kHz can reach 30 dB and more. In consequence, when signals are recorded on a magnetic tape recorder whose dynamic range does not exceed 40 dB, the high-frequency portion of the spectrum can be lost.

The known devices for recording seismoelectric signals use a short-circuited wire loop as a shot instant pickup element which is placed in the explosive charge. The signal generated by the explosion when the loop is broken is registered by the pickup. Since the shot-firing machine, the charge and the seismoelectric recorder are connected by wire, the input of the recorder can receive, at the instant of explosion, a powerful signal which can damage the input circuitry of the device (cf., for example, Seismoelectric method of prospecting minerals using Kvarts-1 device" edited by V. K. Komarov, Leningrad 1974).

Also known in the art are devices for recording seismoelectric signals, wherein the shot instant pickup is a portable radio set. But such sets are difficult to make compatible with input circuits of the device. In addition they are not protected against the explosion.

SUMMARY OF THE INVENTION

It is an object of the invention to provide a device for recording seismoelectric signals, having higher sensitivity and a larger dynamic range and a broader frequency band for seismoelectric signals to be recorded.

The above object is achieved in a device for recording seismoelectric signals, comprising seismoelectric signal pickups, amplifiers connected to said pickups, a magnetic tape recorder for respective analog electrical signals, and a time mark generator connected to the magnetic tape recorder, according to the invention, at least three channels are provided to receive seismoelectric signals in different frequency bands forming a continuous frequency-respense characteristic. Each channel has a magnetic antenna as a seismoelectric signal pickup, which is series-connected with an amplifier and a generator of a uniform frequency characteristic in the frequency band corresponding to a particular channel and which together generate a total frequency-response characteristic which is uniform throughout the frequency band of the seismoelectric signal being recorded. Also provided, as magnetic recorders, are two video recorders, the output of the most low-frequency channel for receiving a seismoelectric signal being connected to the first video recorder, while the second video recorder is connected, via an adder, to the outputs of the other channels.

The device according to the invention makes geophysical investigations more efficient and economical.

It is advisable that the device be provided with a shot instant mark generator whose input is connected to the shot instant pickup, and two recording signal generators, one input of each said generator being connected to an output of the shot instant mark generator, other input of each said recording signal generator being connected to an output of, respectively, the first channel and the adder, while the output of each recording signal generator is connected to an input of the video channel of a respective video recorder.

Recording sync inputs of each recording signal generator can be coupled with an output of the time mark generator.

It is also advisable that the device be provided with a light-emitting diode connected to the output of the shot instant pickup and a reciprocating photodiode connected to the input of the shot instant mark generator.

The shot instant pickup is, therefore, isolated galvanically from other units of the device.

The device according to the invention makes geophysical investigations more effective and economical due to protection of the equipment against the high-voltage pulse of the shot-firing machine and the explosion pulse.

BRIEF DESCRIPTION OF THE DRAWINGS

Other objects and advantages of the invention will become more apparent from the following description of preferred embodiments thereof, taken is conjunction with the accompanying drawings, wherein:

FIG. 2 shows a block diagram of a shot instant mark generator, according to the invention;

FIG. 3 shows a plot of a scale effective height of the magnetic antenna as a function of frequency.

DESCRIPTION OF THE PREFERRED EMBODIMENT

Figure 1:
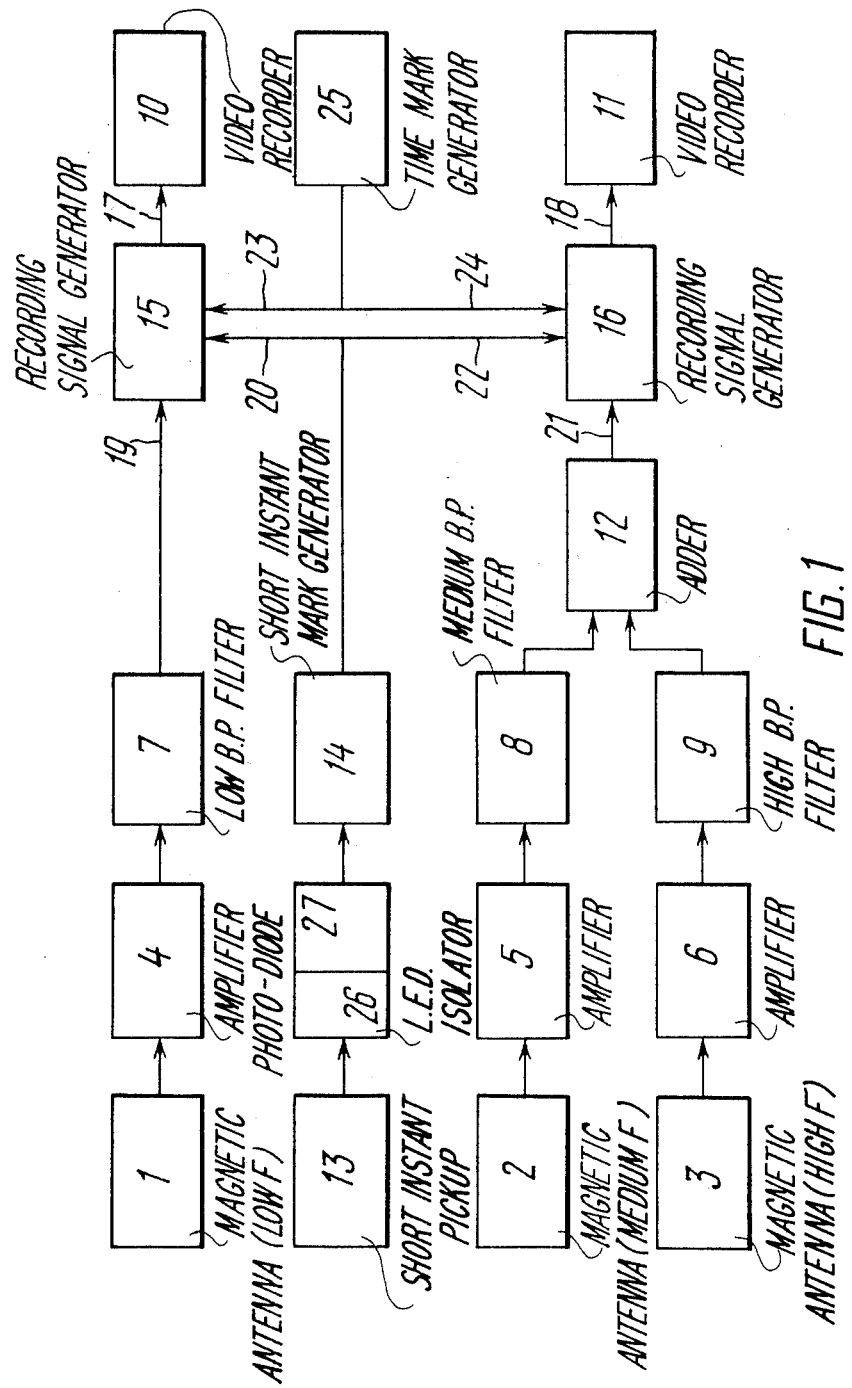
FIG. 1 shows a block diagram of a device for recording seismoelectric signals, according to the invention.

A device for recording seismoelectric signals comprises three channels for receiving seismoelectric signals in different frequency bands. Each channel comprises a seismoelectric pickup which is a magnetic antenna 1, 2 or 3 (FIG. 1) and an amplifier 4, 5 or 6. Each amplifier 4, 5 or 6 is connected by the input thereof to the respective magnetic antenna 1, 2 or 3.

Each channel also comprises a uniform frequency-response characteristic former 7, 8 or 9 in the frequency band of each respective channel. The formers 7, 8 and 9 are bandpass filters adjusted for a respective frequency band.

The device is provided with a magnetic recorder of seismoelectric signals, which are two video recorders 10 and 11. The output of the former 7 positioned in the low-frequency receiving channel is connected to the video recorder 10. The two other formers 8 and 9 of the other channels are connected to the second video recorder 11 via an adder 12.

The device also comprises a shot instant pickup 13, a shot instant mark generator 14 connected in series with said pickup 13, and two recording signal generators 15 and 16, the output of the first generator 15 being connected to an input 17 of the video channel of the recorder 10, while the output of the second generator 16 is connected to an input 18 of the video channel of the recorder 11. Inputs 19 and 20 of the generator 15 are connected to the output of the former 7 of the first channel and to the output of the generator 14, respectively, while inputs 21 and 22 of the generator 16 are connected to the output of the adder 12 and the output of the generator 14, respectively.

Generators 15 and 16 have, apart from above inputs, sync inputs 23 and 24 connected to the output of a time mark generator 25.

The shot instant pickup 13 is isolated galvanically from the rest of the device by means of an electron-optical pair composed of a light-emitting diode 26 connected to the output of the pickup 13 and a reciprocating photodiode 27 connected to the input of the generator 14.

All units of the proposed device are conventional except for the shot instant mark generator 14 which comprises a pulse generator 28 (FIG. 2), a one-shot multivibrator 29 whose input is connected to the photodiode 27, and a gating circuit 30 whose one input 31 is connected to the output of the one-shot multivibrator 29 and the other input 32 is connected to the output of the generator 28.

The device for recording seismoelectric signals operates as follows.

Seismoelectric signals received by the low-frequency magnetic antenna 1, the medium-frequency magnetic antenna 2 and the high-frequency magnetic antenna 3 and amplified by the amplifiers 4, 5, 6 and are supplied to the inputs of the band pass filters or, respectively, to the low-frequency former 7, the medium-frequency former 8 and the high-frequency 9. The output signal of the former 7 is delivered to the first input of the first recording signal generator 15. The output signals of the formers 8 and 9 are furnished to the inputs of the adder 12. The signals at the output of the adder 12 contains medium-frequency and high-frequency components and is fed to the first input of the second generator 16.

Since three magnetic antennas 1–3 are used as pick-ups of seismoelectric signals, the industrial noises can be drastically reduced as compared to earlier receiving electrodes and, consequently, the sensitivity of the device is substantially improved. Moreover, the combination of the magnetic antennas 1–3 and bandpass filters helps obtain a practically flat frequency-response characteristic of the receiving channel within the range of from 200 Hz to 3 mHz, which could not be obtained with receiving electrodes.

A uniform frequency-response characteristic is formed as follows. It has been known that the scale (reduced) effective height of any magnetic antenna composed of an antenna coil and a core is given by an expression:

$$h' = \frac{2\pi S}{\lambda} w\mu Q(f) = \frac{2\pi f S}{c} w\mu Q(f) \qquad (1)$$

where:

λ were length of received signals;
f frequency of received signals;
s cross-sectional area of the magnetic antenna;
c velocity of light;
w number of loops of the antenna coil;
μ effective permeability of the antenna core;
Q(f) coefficient for the resonance properties of the antenna The plot 33 of the effective height h' of the magnetic antenna as a function of the frequency f is illustrated in FIG. 3. It can be seen that in the frequency region well below the resonance frequency $f_o$ of the magnetic antenna the curve 34 rises linearly at approximately 20 dB for a decade. Nearer to the resonance region the curve 33 of the effective height h' of the magnetic antenna being the function of the frequency f becomes essentially nonlinear. But, if only the region of the frequency f having linear relation h'(f) is used for reception and the frequency-dependent correction of 20 dB for a decade is introduced, the frequency-response characteristic of such a channel can be flattened in this frequency region. This is exactly the technique employed in this invention.

Figure 4:
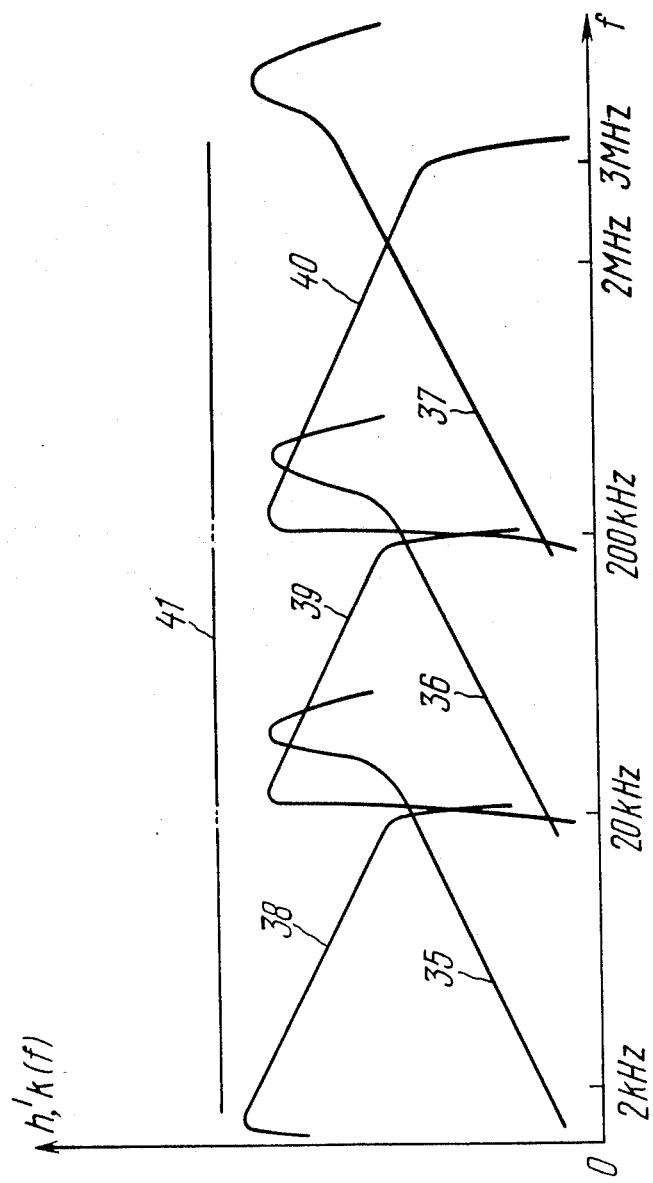
FIG. 4 shows the resulting amplitude-frequency characteristic of the seismoelectric signal receiving channels.

FIG. 4 illustrates the effective heights h' of the three receiving magnetic antennas 1-3 as functions of the frequency and frequency characteristics of respective bandpass filters which are formers 7, 8 and 9. Specifically, FIG. 4 shows the curves 35, 36 and 37 of the effective heights of respective magnetic antennas 1, 2 and 3 against the frequency f, and the amplitude-frequency characteristics 38, 39 and 40 of the formers 7, 8 and 9 respectively, and the resulting frequency-response characteristic 41 of the receiving channel of the device.

The plots 35, 36 and 37 of the effective heights of magnetic antennas as functions of the frequency and respecitve amplitude-frequency characteristics 38, 39 and 40 of the bandpass filters demonstrate the way the uniform frequency-response characteristic 41 of the receiving channel is formed in the transmission band of each bandpass filter. The sensitivity of the device is reduced to a uniform level in each frequency band by using respective amplification (or gain) factors of the amplifiers 4, 5 and 6.

The device is much more readily adaptable for technical realization because the medium-frequency components (20 kHz . . . 200 kHz) and the high-frequency components (200 kHz . . . 3 mHz) of the seismoelectric signal spectrum are received individually and no excessive demands for amplification and dynamic range are imposed upon the amplifiers 5 and 6, which usually are the reason for their overcomplication and special arrangements to make the amplifiers more stable and reduce the intrinsic noises and the like.

The signal produced by the pickup 13 at the moment of explosion is delivered, via the electrode-optical pair composed of the light-emitting diode 26 and the photodiode 27, to the input of the shot instant mark generator 14. The code unit produced by the generator 14 is applied to the inputs 20 and 22 of the recording signal generators 15 and 16 to be later recorded by the video recorders 10 and 11.

The electron-optical pair galvanically separates the pickup 13 and the other units of the device. In addition, is provides a reliable protection of the input circuits against the power ful pulses accompanying the explosion.

The arrival of seismoelectric signals can be defined much more accurately, within 5 microseconds, due to the special shot instant mark used in the device, which is recorded on one track of the video recorder with the information carrying signal.

The time mark generator 25 produces time mark signals which are supplied to the inputs 23 and 24 of the recording signal generators 15 and 16. The output signals of the generator 15 are applied to the input of the video recorder 10, while the output signals of the generator 16 are applied to the input of the video recorder 11.

The frequency band of recorded signals is substantially, up to 3 mHz, expanded due to video recorders being used as magnetic recording devices.

The proposed device uses sync pulses of a compositie picture signal as time marks. This composite synchronizing signal should be introduced into the recording signals for proper operation of the video recorders 10 and 11. Besides, the vertical and line synchronizing pulses available in the recorded signal can be used as reference pulses to synchronize the information processing equipment.

The low-frequency component of the seismoelectric signal is recorded on an individual recorder because the ratio between the amplitudes in the spectrum up to 20 kHz and the amplitudes in the spectrum above 20 kHz can reach 30 dB and more, for example, during exploration by piezoelectric method in rocks containing piezoelectric minerals, such as quartz or sphalerite. In this case the bulk of energy of the seismoelectric signal is contained in the explosion elastic wave range, from 1 to 2 kHz, whereas the high-frequency components carrying the essential information on the rock have a relative level of 30 dB and less. When signals are recorded on a magnetic recording device whose dynamic range is as a rule not higher than 40 dB, a part of the high-frequency spectrum could be lost. The low-frequency portion of the spectrum cannot be neglected because it carries useful information on the location of ore bodies, availability of piezoelectrics and the like. The low-frequency component contains also an indication of the direction of the texture axis of the piezoelectric body. Furthermore, the rate of the amplitudes in the low-frequency ($<20$ kHz) and high-frequency ($>20$ kHz) parts of the spectrum is also in important information parameter.

To conclude, individual recording of the low-frequency and high-frequency components of the spectrum of the seismoelectric signal using two video recorders 10 and 11 expands the dynamic range wherein seismoelectric signals can be recorded up to 46 dB.

In addition, the sensitivity of the device is improved, the wider dynamic range of recorded signals makes the frequency band larger and the determination of the signal arrival instant more accurate.

This device can be used for prospecting polymineral ore bodies in the process of rock burst prediction or seismoelectric signal investigation.

What is claimed is:

1. A device for recording seismoelectric signals, comprising seismoelectric signal pickups, amplifiers (4–6) connected to said pickups, a magnetic tape recorder (10, 11) for recording respective analog electrical signals, and a time mark generators (25) connected to the magnetic tape recorder (10, 11), characterized in that said device is provided with at least three channels to receive seismoelectric signals in different frequency bands forming a continuous frequency-response characteristic, each channel having a magnetic antenna (1-3) as a seismographic signal pickup, which is series-connected with an amplifier (4–6) and a generator (7-9) of a uniform frequency characteristic in the frequency band corresponding to a particular channel, and which together generating a total frequency-response characteristic which is uniform throughout the frequency band of the seismographic signal being recorded, and is also provided with two video recorders as magnetic recorders (10, 11) the first video recorder (10) being connected to the output of the most low frequency channel for receiving a seismographic signal, while the second video recorder (11) is connected, via an adder (12), to the outputs of all other channels.

2. A device as claimed in claim 1, characterized in that said device comprises a shot instant mark generator (14) whose input is connected to a shot instant pickup (13), and two recording signal generators (15, 16), one input (20, 22) of each said two recording signal generators (15, 16) being connected to an output of the shot instant mark generator (14), the other input (19, 21) of each said recording signal generator (15, 16) being connected to an output of, respectively, the first channel and the adder (12), while the output of each of said two recording signal generators (15, 16) is connected to an input (17, 18) of the video channel of a respective video recorder (10, 11).

3. A device as claimed in claim 2, characterized in that sync inputs (23, 24) of each of said said two recording signal generator (15, 16) are connected to the output of the time mark generator (25).

4. A device as claimed in claim 2, further comprising a light emitting diode (26) connected to an output of said shot instant pickup (13) and a photodiode (27) interacting with said light-emitting diode (26) and connected to an input of said shot instant mark generator (14).

* * * * *